United States Patent
Krishnakumar et al.

(10) Patent No.: US 12,246,693 B2
(45) Date of Patent: Mar. 11, 2025

(54) COMPUTER SYSTEM AND A COMPUTER-IMPLEMENTED METHOD OF COUNTERACTING MOTION OF A VEHICLE HAVING A DRIVER'S CABIN

(71) Applicant: VOLVO TRUCK CORPORATION, Gothenburg (SE)

(72) Inventors: Niveditha Krishnakumar, Gothenburg (SE); Nithyanandan Ponnusamy, Tamil Nadu (IN)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/613,836

(22) Filed: Mar. 22, 2024

(65) Prior Publication Data
US 2024/0343237 A1 Oct. 17, 2024

(51) Int. Cl.
*F16H 61/16* (2006.01)
*B60T 1/00* (2006.01)
(Continued)

(52) U.S. Cl.
CPC .............. *B60T 8/885* (2013.01); *B60T 1/005* (2013.01); *B60T 8/92* (2013.01); *F16H 61/16* (2013.01);
(Continued)

(58) Field of Classification Search
CPC ...... F16H 61/16; F16H 2312/04; B60T 8/885; B60T 8/92; B60T 1/005; B60T 2210/20;
(Continued)

(56) References Cited

U.S. PATENT DOCUMENTS 5,711,139 A * 1/1998 Swanson ................. A01D 75/28
280/6.154
11,262,756 B2 * 3/2022 Phillips ................. B60W 30/12
(Continued)

FOREIGN PATENT DOCUMENTS

FR 2257473 A1 8/1975
JP 2014187842 A 10/2014
JP 2017063535 A 3/2017

OTHER PUBLICATIONS

Extended European Search Report in corresponding European Application No. 23167647.9 dated Sep. 26, 2023 (5 pages).

*Primary Examiner* — Edwin A Young
(74) *Attorney, Agent, or Firm* — Venable LLP; Jeffri A. Kaminski

(57) ABSTRACT

A computer system comprising processing circuitry is configured to determine, for a vehicle comprising a driver's cabin, that an engine or a motor of the vehicle has been turned off; receive, from a gradient determining device provided on the vehicle, information indicative of the gradient of the ground on which the vehicle stands; receive, from a sensor device of the vehicle, information indicative of the vehicle being in motion; determine, based on information or based on lack of information from an in-cabin sensor of the vehicle, that the driver is outside of the cabin; and control a gear arrangement of the vehicle to engage a forward gear or a reverse gear based on the information from the gradient determining device, in order to counteract movement of the vehicle due to the gradient of the ground.

18 Claims, 6 Drawing Sheets

(51) Int. Cl.
*B60T 8/88* (2006.01)
*B60T 8/92* (2006.01)

(52) U.S. Cl.
CPC ....... *B60T 2210/20* (2013.01); *B60T 2220/04* (2013.01); *B60T 2240/00* (2013.01); *B60T 2250/00* (2013.01); *B60T 2270/402* (2013.01)

(58) Field of Classification Search
CPC ............. B60T 2220/04; B60T 2240/00; B60T 2250/00; B60T 2270/402
See application file for complete search history.

(56) References Cited

U.S. PATENT DOCUMENTS

| | | |
|---|---|---|
| 2009/0305848 A1 | 12/2009 | Straub et al. |
| 2013/0066525 A1 | 3/2013 | Tomik et al. |
| 2014/0228171 A1 | 8/2014 | Kaneko |
| 2016/0009257 A1 | 1/2016 | Joyce et al. |
| 2017/0267244 A1 | 9/2017 | Kim |
| 2018/0319379 A1 | 11/2018 | Armstrong |
| 2021/0070261 A1* | 3/2021 | Zula .......................... B60T 8/17 |

* cited by examiner

COMPUTER SYSTEM AND A COMPUTER-IMPLEMENTED METHOD OF COUNTERACTING MOTION OF A VEHICLE HAVING A DRIVER'S CABIN

TECHNICAL FIELD

The disclosure relates generally to counteracting undesired vehicle motion. In particular aspects, the disclosure relates to a computer system and to a computer-implemented method of counteracting motion of a vehicle having a driver's cabin. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

It may sometimes happen that when drivers get out of the cabin of their heavy-duty vehicle, they have inadvertently forgotten to apply the parking brakes or the parking brakes have simply failed. This may lead to the vehicle starting to move when on an inclined surface, which may result in an accident.

SUMMARY

According to a first aspect of the disclosure, there is provided a computer system comprising processing circuitry configured to:
  determine, for a vehicle comprising a driver's cabin, that an engine or a motor of the vehicle has been turned off,
  receive, from a gradient determining device provided on the vehicle, information indicative of the gradient of the ground on which the vehicle stands,
  receive, from a sensor device of the vehicle, information indicative of the vehicle being in motion,
  determine, based on information or based on lack of information from an in-cabin sensor of the vehicle, that the driver is outside of the cabin,
  control a gear arrangement of the vehicle to engage a forward gear or a reverse gear based on the information from the gradient determining device, in order to counteract movement of the vehicle due to the gradient of the ground.

The first aspect of the disclosure may seek to provide increased safety for events when a driver has omitted to apply the parking brake and has left the cabin. A technical benefit may include that the present system may counteract inadvertent vehicle motion upon determining that the driver is no longer in the cabin and thus not able to counteract the motion. In particular, the present system takes into account the direction of the slope in order to engage either a forward gear or a reverse gear, whereby the movement of the vehicle can be counteracted. For example, if the gradient is such that the vehicle rolls in a forward direction (downward slope), a reverse gear may be engaged, whereas if the gradient is such that the vehicle rolls in a rearward direction (upward slope), a forward gear may be engaged. Applying a gear based on the gradient is also beneficial as it provides an additional level of safety in case the brakes cannot be automatically applied. Thus, the computer system of the present disclosure may, in at least some examples, first attempt to apply the brakes when it has been detected that the driver has left the cabin and the vehicle is rolling, and if the brakes fail, a gear is engaged based on the direction of the gradient. In other examples, the gear may be engaged without first attempting to apply the brakes, or the gear may be engaged simultaneously with attempting to apply the brakes.

The in-cabin sensor may in some examples be configured provide positive confirmation of the cabin being occupied by the driver, wherein lack of information from the in-cabin sensor may be assessed as the driver not being in the cabin. In other examples, the in-cabin sensor may be configured to provide negative confirmation, i.e. sending information to the processing circuitry when the cabin is not occupied by the driver. In still other examples, the in-cabin sensor may be configured to provide both positive and negative confirmation depending on the presence or not of the driver, i.e. sending messages to the processing-circuitry, the informational content either confirming that the driver is inside the cabin, or confirming that the driver is not inside the cabin.

Optionally, in some examples, including in at least one preferred example, the processing circuitry may further be configured to:
  receive, from a parking brake sensor, information indicative of the parking brake of the vehicle being in a released condition,
wherein the processing circuitry is configured to perform said act of controlling the gear arrangement after receiving said information indicative of the parking brake being in a released condition.

A technical benefit may include that by checking the condition of the parking brake at an early stage before determining to engage a gear, the processing circuitry may have an opportunity to alert the driver such that the driver applies the parking brake, or the processing circuitry may even control the parking brake to become engaged. In case that fails, by acknowledging that the parking brake is in a released condition, for whatever reason, the processing circuitry may afterwards advantageously engage the gear to counteract vehicle movement.

Optionally, in some examples, including in at least one preferred example, the processing circuitry may further be configured to, upon receiving said information indicative of the parking brake being in a released condition and based on the information from the in-cabin sensor and at least one of the gradient determining device and said sensor device:
  send an instruction message to a parking brake system to apply the parking brake,
wherein the processing circuitry is configured to perform said act of controlling the gear arrangement upon determining that application of the parking brake has failed despite the sending of the instruction message.

A technical benefit may include that dual levels of safety is provided. In particular, by detecting that the driver has left the cabin, in addition to detecting a risk of movement (gradient is non-zero) or an actual movement of the vehicle, the processing circuitry may initially attempt to get the parking brake engaged, and if that fails, as a backup, the processing circuitry may engage the gear based on the determined gradient.

Optionally, in some examples, including in at least one preferred example, the processing circuitry may further be configured to, upon determination that the vehicle is still in motion despite the controlling of the gear arrangement:
  control a retarder of the vehicle to become engaged for counteracting the vehicle motion.

A technical benefit may include that it provides a further level of safety. In case the gears have not been successfully engaged, e.g. due to some malfunctioning, the vehicle may still be stopped by engaging the retarder.

As already mentioned above, depending on the direction of a slope in which the vehicle is standing, either a reverse gear or a forward gear may be engaged. This is reflected in the following example.

Optionally, in some examples, including in at least one preferred example, if the information from the gradient determining device is indicative of the vehicle standing in uphill, the processing circuitry is configured to control the gear arrangement to engage a forward gear, whereas if the information from the gradient determining device is indicative of the vehicle standing in downhill, the processing circuitry is configured to control the gear arrangement to engage a reverse gear. A technical benefit may include that by determining the direction of the inclination an appropriate gear may be selected to effectively counteract vehicle motion.

Optionally, in some examples, including in at least one preferred example, if the information from the gradient determining device is indicative of the vehicle being on a substantially horizontal surface, the processing circuitry is configured to control a retarder of the vehicle to become engaged. A technical benefit may include that engaging a retarder may provide a good safety measure on a substantially horizontal surface. In particular, in case of any tolerances, if the substantially horizontal surface has a small inclination in one direction which has not been detected, it may be better to apply the retarder than risking applying an incorrect gear (e.g. forward gear when rear gear should have been applied). Another possible scenario is that even if the surface is substantially horizontal, one or more wheels may stand on a bump or other irregularity in the road surface which may cause the vehicle to be set in motion. Also in this case, if the irregularity has not been detected to determine the possible direction of motion of the vehicle, engaging the retarder may be preferred to avoiding the risk of engaging the incorrect gear.

Optionally, in some examples, including in at least one preferred example, the processing circuitry may further be configured to determine, based on input from a brake pedal sensor or lack of input from the brake pedal sensor, that the brake pedal is not being pressed, wherein the processing circuitry is configured to perform said act of controlling the gear arrangement after determining that the brake pedal is not being pressed. A technical benefit may include that the gear is not engaged unnecessarily. If the processing circuitry determines that the brake pedal is being pressed, then this may be indicative of the driver still being in control, allowing the vehicle to move on purpose. The determination that the brake pedal is not being pressed may also function as redundancy, confirming that the information (or lack of information) from the vehicle sensor that is indicative of the driver being outside of the cabin, is correct.

Optionally, in some examples, including in at least one preferred example, the gradient determining device may be one of an inclination sensor, a gyroscope, an inertial measurement unit (IMU), or a GPS unit. A technical benefit may include that such gradient determining devices may be conveniently installed on a vehicle.

According to a second aspect of the disclosure, there is provided a vehicle comprising the computer system of the first aspect, including any example thereof. The second aspect of the disclosure may seek to provide increased safety for events when a driver has omitted to apply the parking brake and has left the cabin. Technical benefits of the second aspect (and any examples thereof) may include the corresponding technical benefits as discussed above in relation to the first aspect (and any examples thereof).

Optionally, in some examples, including in at least one preferred example, the vehicle may further comprise:
a gradient determining device configured to send, to the processing circuitry, information indicative of the gradient of the ground on which the vehicle stands,
a sensor device, such as a wheel speed sensor, configured to send, to the processing circuitry, information indicative of the vehicle being in motion, and
an in-cabin sensor configured to send, to the processing circuitry, information indicative of the vehicle being inside or outside of the cabin.

Technical benefits may include those discussed above in relation to the computer system of the first aspect and examples thereof. The gradient determining device may be any of the examples mentioned above. The in-cabin sensor may have the functionality already discussed above.

According to a third aspect of the disclosure, there is provided a computer-implemented method of counteracting motion of a vehicle having a driver's cabin, the method comprising:
determining, by processing circuitry of a computer system, that an engine or a motor of the vehicle has been turned off,
receiving, by the processing circuitry, information indicative of the gradient of the ground on which the vehicle stands,
receiving, by the processing circuitry, information indicative of the vehicle being in motion,
determining, by the processing circuitry, that the driver is outside of the cabin, and
controlling a gear arrangement of the vehicle to engage a forward gear or a reverse gear based on the information indicative of the gradient, in order to counteract movement of the vehicle due to the gradient of the ground.

The third aspect of the disclosure may seek to provide increased safety for events when a driver has omitted to apply the parking brake and has left the cabin. Technical benefits of the third aspect (and any examples thereof) may include the corresponding technical benefits as discussed above in relation to the first aspect (and any examples thereof).

Optionally, in some examples, including in at least one preferred example, the method may further comprise:
receiving, by the processing circuitry, information indicative of the parking brake of the vehicle being in a released condition, wherein said controlling of the gear arrangement is performed after receiving said information indicative of the parking brake being in a released condition.

A technical benefit may include that by checking the condition of the parking brake at an early stage before determining to engage a gear, the processing circuitry may have an opportunity to alert the driver such that the driver applies the parking brake, or the processing circuitry may even control the parking brake to become engaged.

Optionally, in some examples, including in at least one preferred example, the method may further comprise, upon receiving said information indicative of the parking brake being in a released condition, and based on the determination that the driver is outside of the cabin and on at least one of the information indicative of the gradient and the information indicative of the vehicle being in motion:
sending, by the processing circuitry, an instruction message to a parking brake system to apply the parking brake, wherein said controlling of the gear arrangement is performed upon determining that application of the parking brake has failed despite said sending of the instruction message. A technical benefit may include that dual levels of safety is provided.

Optionally, in some examples, including in at least one preferred example, the method may further comprise, upon determination that the vehicle is still in motion despite the controlling of the gear arrangement:
controlling, by the processing circuitry, a retarder of the vehicle to become engaged for counteracting the vehicle motion. A technical benefit may include that it provides a further level of safety.

Optionally, in some examples, including in at least one preferred example, the method may further comprise:
upon determination that the vehicle is standing in uphill, controlling, by the processing circuitry, the gear arrangement to engage a forward gear, and
upon determination that the vehicle is standing in downhill, controlling, by the processing circuitry, the gear arrangement to engage a reverse gear.

A technical benefit may include that by determining the direction of the inclination an appropriate gear may be selected to effectively counteract vehicle motion.

Optionally, in some examples, including in at least one preferred example, the method may further comprise:
upon determination that the vehicle is standing on substantially horizontal surface, controlling, by the processing circuitry, a retarder of the vehicle to become engaged.

A technical benefit may include that engaging a retarder may provide a good safety measure on a substantially horizontal surface.

Optionally, in some examples, including in at least one preferred example, the method may further comprise:
determining, by the processing circuitry, that the brake pedal of the vehicle is not being pressed, wherein said controlling of the gear arrangement is performed after determining that the brake pedal is not being pressed. A technical benefit may include that the gear is not engaged unnecessarily.

According to a fourth aspect of the disclosure, there is provided a computer program product comprising program code for performing, when executed by the processing circuitry, the method of the third aspect, including any examples thereof. The fourth aspect of the disclosure may seek to provide increased safety for events when a driver has omitted to apply the parking brake and has left the cabin. Technical benefits of the fourth aspect (and any examples thereof) may include the corresponding technical benefits as discussed above in relation to the first and third aspects (and any examples thereof).

According to a fifth aspect of the disclosure, there is provided a non-transitory computer-readable storage medium comprising instructions, which when executed by the processing circuitry, cause the processing circuitry to perform the method of the third aspect, including any examples thereof. The fifth aspect of the disclosure may seek to provide increased safety for events when a driver has omitted to apply the parking brake and has left the cabin. Technical benefits of the fifth aspect (and any examples thereof) may include the corresponding technical benefits as discussed above in relation to the first and third aspects (and any examples thereof).

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

The teachings of the present disclosure may be implemented in order to reduce the risk of accidents occurring in case a driver gets out of the cabin of a heavy-duty vehicle and inadvertently forgets to apply the parking brakes. According to the present disclosure, a control action may be taken to counteract vehicle movement.

Figure 1:
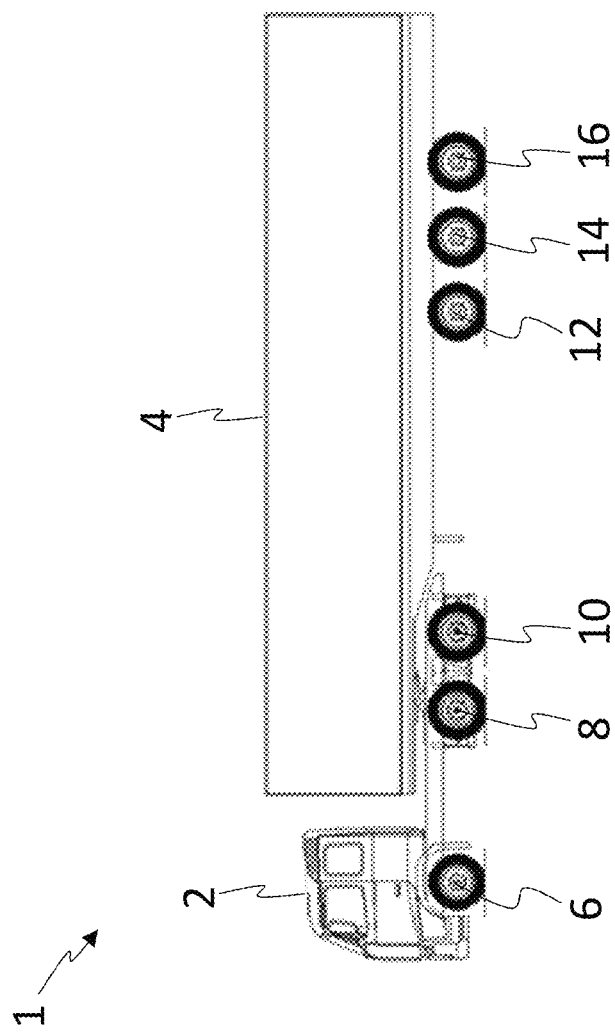
FIG. 1 schematically illustrates a vehicle according to one example of this disclosure.

FIG. 1 schematically illustrates a vehicle 1 according to one example of this disclosure. More specifically, the illustrated vehicle 1 is a heavy-duty vehicle combination which comprises a tractor unit 2 and a trailer unit 4. The tractor unit 2 has three wheel axles 6, 8, 10, each one of the wheel axles 6, 8, 10 having at least one left wheel and at least one right wheel. In this example, the tractor unit 2 has a front axle 6 and two rear axles 8, 10. One of the rear axles 8, 10 may be a lift axle. The trailer unit 4 is also illustrated as having three wheel axles 12, 14, 16, each one having at least one left wheel and at least one right wheel. Standard braking of the left and right wheels of the vehicle 1 may be controlled by a driver in the cabin 2, using for example a parking brake and/or service brake. The teachings of the present disclosure are not limited to a particular vehicle propulsion system, i.e., the teachings herein may be implemented for vehicles propelled by internal combustion engines, traction batteries, fuel cells, hybrid systems, etc.

Figure 2:
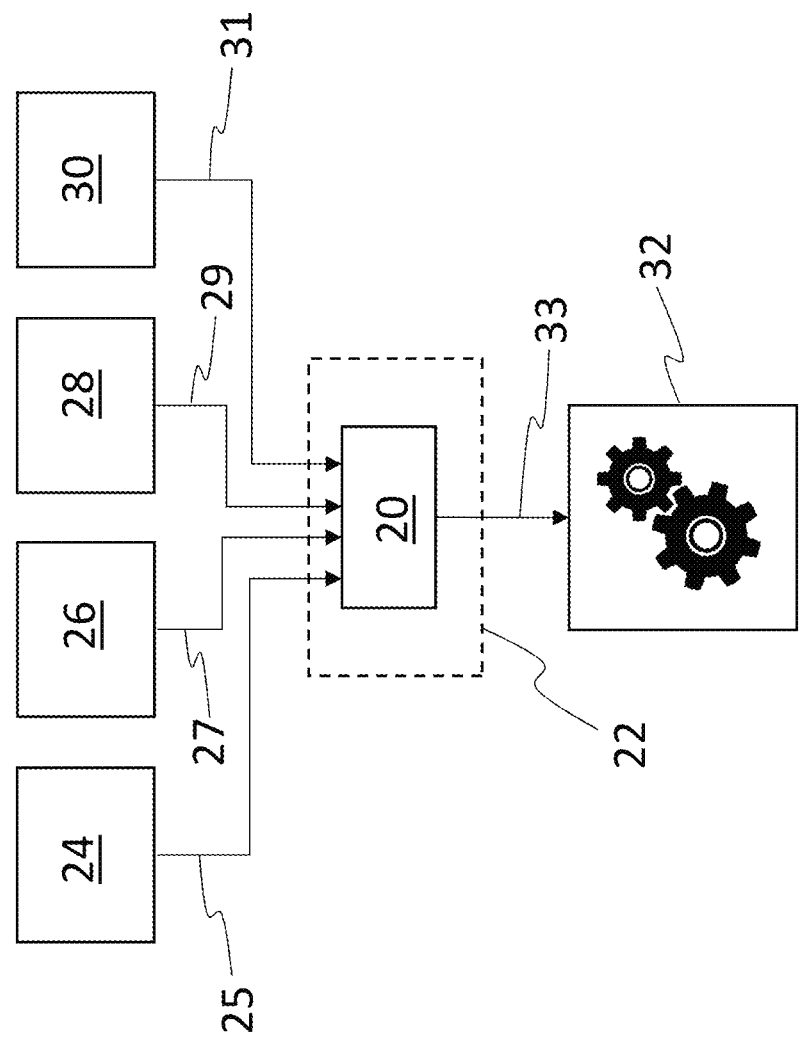
FIG. 2 schematically illustrates an operation of a processing circuitry of a computer system, in accordance with one example of this disclosure.

FIG. 2 schematically illustrates an operation of a processing circuitry 20 of a computer system 22, in accordance with one example of this disclosure. More specifically, FIG. 2 illustrates a computer system 22 which comprises a processing circuitry 20 which is configured to communicate and receive input from and send output to various devices, arrangements and/or systems 24, 26, 28, 30, 32. The processing circuitry 20 is configured to determine, for a vehicle comprising a driver's cabin (such as the cabin 2 of the vehicle 1 in FIG. 1), that an engine or a motor of the vehicle has been turned off. For example, in case the vehicle has an ignition system 24, in which an ignition key can be set in an "on" or "off" state, the processing circuitry 20 can obtain information 25 about the state and determine, based on the state of the ignition key, whether the engine has been turned off or not.

The processing circuitry 20 is configured to receive, from a gradient determining device 26 provided on the vehicle, information 27 indicative of the gradient of the ground on which the vehicle stands. The gradient determining device 26 may, for instance, be an inclination sensor, a gyroscope, an inertial measurement unit (IMU), or a GPS-unit. For example, the gradient of the ground may be such that the vehicle is standing in an uphill slope, in a downhill slope, or on substantially planar ground (no slope).

The processing circuitry 20 is configured to receive, from a sensor device 28 of the vehicle, information 29 indicative of the vehicle being in motion. The sensor device 28 may, for instance, comprise a wheel speed sensor, an accelerometer, a camera, etc.

The processing circuitry 20 is configured to determine, based on information 31 or based on lack of information from an in-cabin sensor 30 of the vehicle, that the driver is outside of the cabin. The in-cabin sensor 30 may, for instance, include a proximity sensor, a weight sensor in the driver's seat, a camera, etc.

Thus, the processing circuitry 20 is configured to receive input information from various devices, arrangements and/or systems 24, 26, 28, 30. Based on the input information and upon determination that the vehicle has been turned off, and that the driver has left the cabin, and that the vehicle is in motion, the processing circuitry 20 can take countermeasures. In particular, the processing circuitry 20 may send control instructions 33 to a gear arrangement 32. In other words, the processing circuitry 20 is configured to control the gear arrangement 32 of the vehicle to engage a forward gear or a reverse gear based on the information 27 from the gradient determining device 26, in order to counteract movement of the vehicle due to the gradient of the ground.

Figure 3:
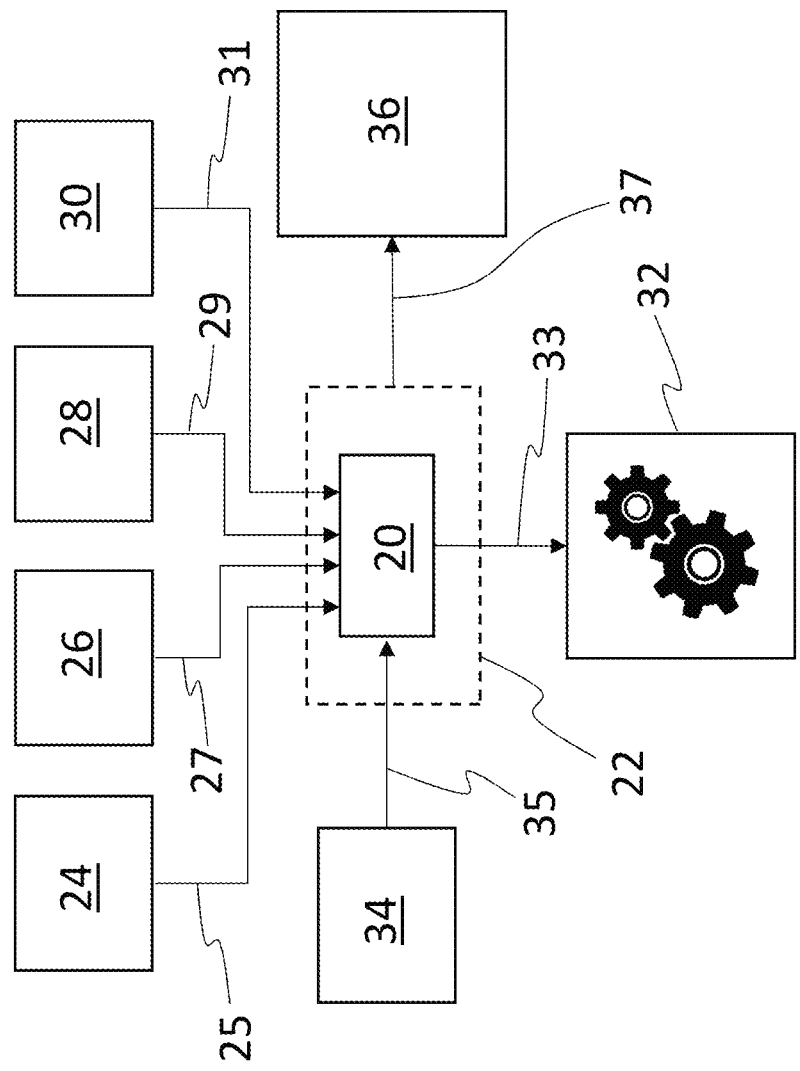
FIG. 3 schematically illustrates further operations of a processing circuitry of a computer system, in accordance with at least some other examples of this disclosure.

FIG. 3 schematically illustrates further operations of a processing circuitry 20 of a computer system 22, in accordance with at least some other examples of this disclosure. More specifically, FIG. 3 illustrates that in addition to the components illustrated in FIG. 2, the processing circuitry 20 may receive additional input information 35 from other devices, represented by the box 34 on the left side of the drawing, and may send control instructions 37 to other devices, arrangements and/or systems than just the gear arrangement, as represented by the box 36 on the right side of the drawing. For instance, in at least some examples, the left side box 34 may represent a parking brake sensor, and the right side box 36 may represent a parking brake system. The processing circuitry 20 may be configured to receive, from the parking brake sensor, information 35 indicative of the parking brake of the vehicle being in a released condition. The processing circuitry 20 may be configured to perform the act of controlling the gear arrangement 32 (by sending control instructions 33) after receiving said information 35 indicative of the parking brake being in a released condition. In particular, the processing circuitry 20 may suitably initially take action to get the parking brake applied, before proceeding to controlling the gear arrangement 32. For instance, the processing circuitry 20 may be configured to, upon receiving said information 35 indicative of the parking brake being in a released condition and based on the information from the in-cabin sensor 30 and at least one of the gradient determining device 26 and said sensor device 28, send an instruction message 37 to the parking brake system to apply the parking brake. Thereafter, the processing circuitry 20 may perform the act of controlling the gear arrangement 32 upon determining that application of the parking brake has failed despite the sending of the instruction message 37.

In at least some examples, the right side box 36 in may be considered to instead or additionally represent the presence of a retarder of the vehicle. The processing circuitry 20 may be further configured to, upon determination that the vehicle is still in motion despite the controlling of the gear arrangement 32, control the retarder to become engaged for counteracting the vehicle motion.

In at least some examples, the left side box 34 may be considered to instead or additionally represent the presence of a brake pedal sensor. The processing circuitry 20 may be further configured to determine, based on input information 35 from the brake pedal sensor or lack of input information from the brake pedal sensor, that the brake pedal is not being pressed, wherein the processing circuitry 20 may perform the act of controlling the gear arrangement 32 after determining that the brake pedal is not being pressed. Thus, by determining that the brake pedal is not being pressed, the processing circuitry 20 gets an additional indication of the driver probably being outside of the cabin. However, in case the in-cabin sensor 30 would malfunction, and the processing circuitry 20 determines that the brake pedal is being pressed, then the processing circuitry 20 may interpret this as the driver being inside the cabin and being in control of the vehicle.

Figure 4A:
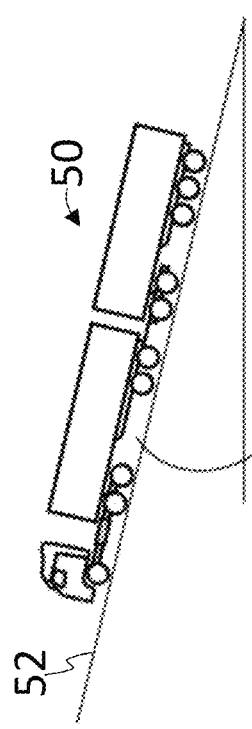
FIGS. 4A-4C schematically illustrates different scenarios for which the processing circuitry may perform different respective control actions.
Figure 4B:
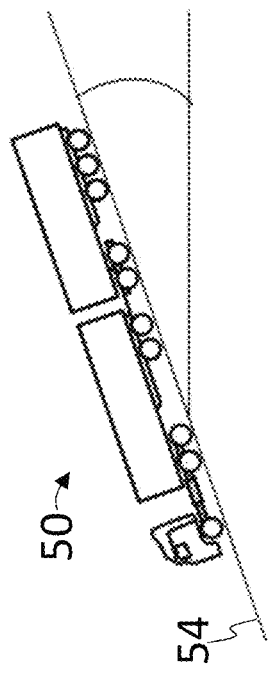
Figure 4C:
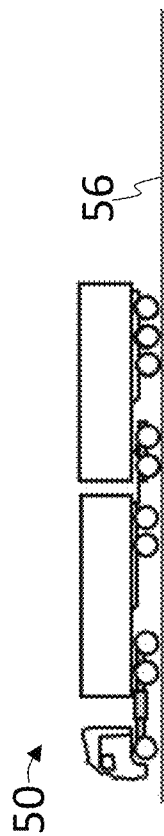

FIGS. 4A-4C schematically illustrates different scenarios for which the processing circuitry may perform different respective control actions. In FIG. 4A, a heavy-duty vehicle 50 is in an uphill slope 52. In FIG. 4B the vehicle 50 is in a downhill slope 54. In FIG. 4C, the vehicle 50 is on planar ground 56. Assuming that the vehicle 50 is equipped with a computer system as disclosed herein (such as discussed above in relation to FIGS. 2 and 3), if the information from the gradient determining device is indicative of the vehicle being in uphill 52 (FIG. 4A) and the processing circuitry has determined that the driver is outside the cabin and the vehicle 50 is moving rearwards, then the processing circuitry may control the gear arrangement to engage a forward gear. In contrast, if the information form the gradient determining device is indicative of the vehicle 50 being in downhill 54 (FIG. 4B) and is moving forwards even though the driver is not inside the cabin, the processing circuitry may control the gear arrangement to engage a reverse gear. If the information from the gradient determining device is neither indicative of an uphill or downhill location, but rather indicative of the vehicle 50 being on a substantially horizontal surface 56 (FIG. 4C), the processing circuitry may control a retarder of the vehicle to become engaged.

Figure 5:
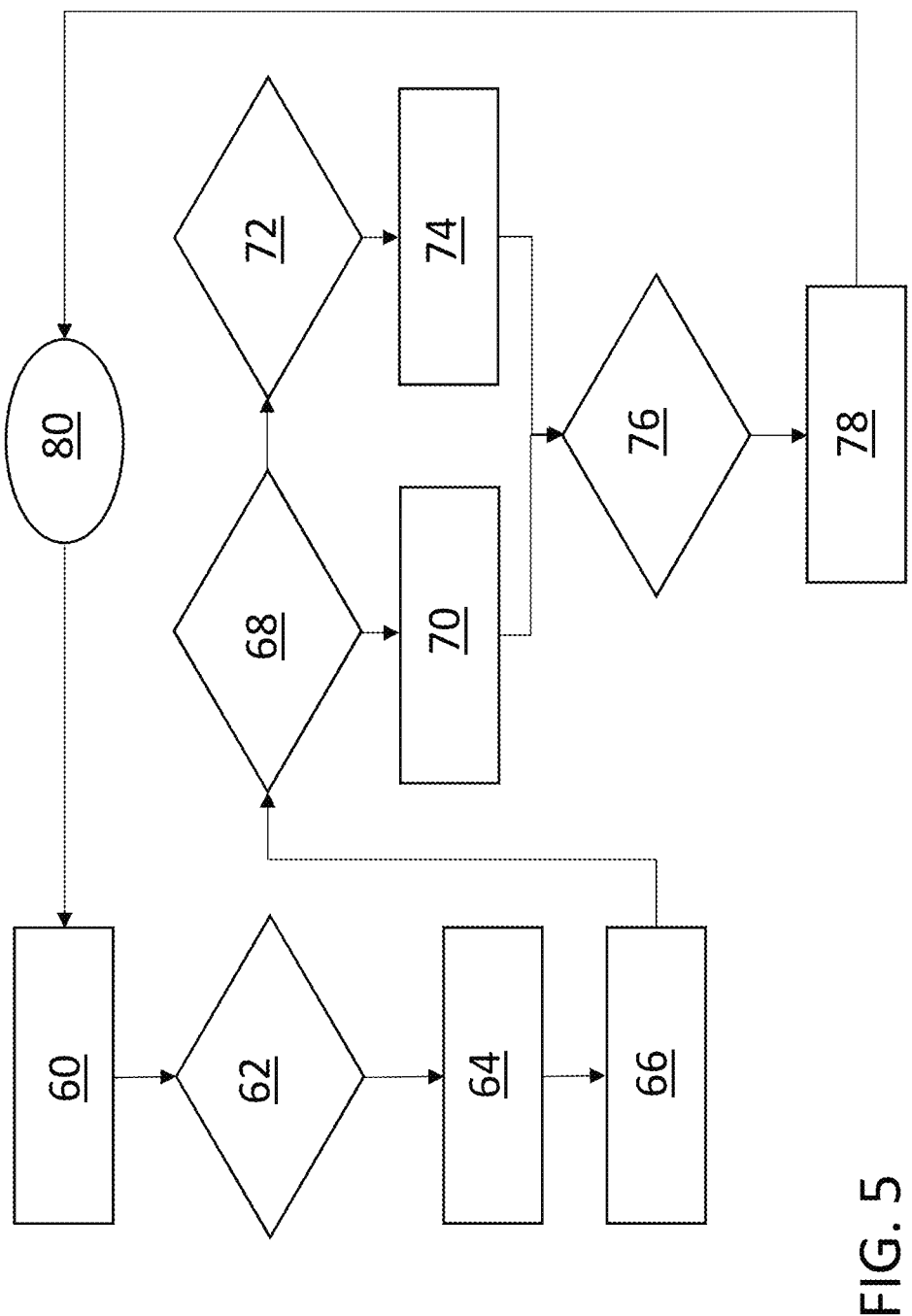
FIG. 5 schematically illustrates a computer-implemented method according to one example of this disclosure.

FIG. 5 schematically illustrates a computer-implemented method according to one example of this disclosure. The method may suitably be implemented by a processing circuitry of a computer system. Although different kinds of hill start solutions are available in some heavy-duty vehicles on the market, they will only work when the vehicle is turned on (e.g. engine or motor is turned on). Instead of connecting a hill start assist solution to a conventional ECU of the vehicle, the processing circuitry of this disclosure may, for instance, comprise an ultra-low power ECU module, thereby being particularly well-suited for operating also when the vehicle is turned off. The method may start once the processing circuitry has been enabled (60).

Next, the processing circuitry may proceed with receiving input information (62). If the received input information (62) indicates that the vehicle (engine/motor) is turned off, such as the ignition key being in an off state, and that the parking brake has not been engaged, and that the vehicle is in motion, and that the ground on which the vehicle is present forms a non-zero gradient, then the processing circuitry may proceed. In particular, the processing circuitry may proceed to check (64) for brake actuators and brake pedal status and apply brakes. The processing circuitry may check (66) for driver presence in the cabin. If no driver is present, then the processing circuitry may determine (68) if the vehicle is in uphill, and in such case a forward gear may be engaged (70). If the vehicle is not in uphill, and the processing circuitry instead determines (72) that the vehicle is in downhill, then a reverse gear may be engaged (74). If the controlling of the gear arrangement is not enough, for example not successful, and the processing circuitry determines (76) that the vehicle is still moving, then the processing circuitry may start the engine and engage (78) the retarder in order to get the vehicle into a parked/standstill state (80).

In a more general form of the computer-implemented method for counteracting motion of a vehicle having a driver's cabin, the method comprises (still with reference to FIG. 5, in which some of the previously discussed action boxes may be omitted):

determining (62), by processing circuitry of a computer system, that an engine or a motor of the vehicle has been turned off, receiving (62), by the processing circuitry, information indicative of the gradient of the ground on which the vehicle stands, receiving (62), by the processing circuitry, information indicative of the vehicle being in motion, determining (66), by the processing circuitry, that the driver is outside of the cabin, and controlling (70, 74) a gear arrangement of the vehicle to engage a forward gear or a reverse gear based on the information indicative of the gradient, in order to counteract movement of the vehicle due to the gradient of the ground.

Figure 6:
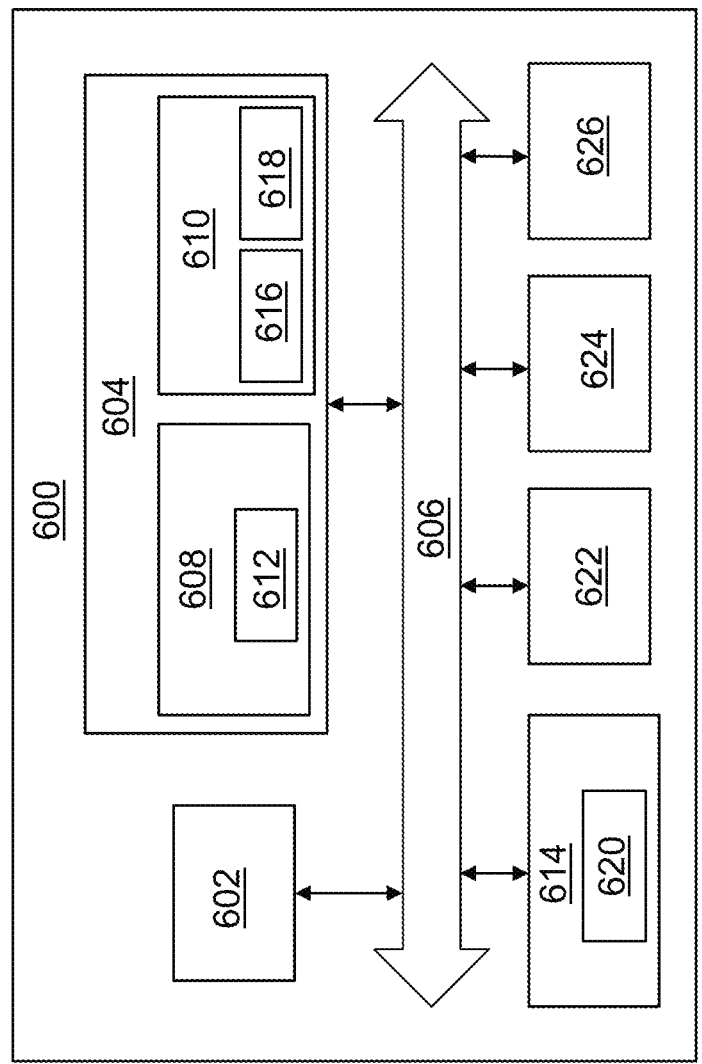
FIG. 6 is a schematic diagram of an exemplary computer system for implementing examples disclosed herein, according to an example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system comprising processing circuitry configured to:
- determine, for a vehicle comprising a driver's cabin, that an engine or a motor of the vehicle has been turned off,
- receive, from a gradient determining device provided on the vehicle, information indicative of the gradient of the ground on which the vehicle stands,
- receive, from a sensor device of the vehicle, information indicative of the vehicle being in motion,
- determine, based on information or based on lack of information from an in-cabin sensor of the vehicle, that the driver is outside of the cabin,
- control a gear arrangement of the vehicle to engage a forward gear or a reverse gear based on the information from the gradient determining device, in order to counteract movement of the vehicle due to the gradient of the ground.

Example 2: The computer system of Example 1, wherein the processing circuitry is further configured to:
- receive, from a parking brake sensor, information indicative of the parking brake of the vehicle being in a released condition, wherein the processing circuitry is configured to perform said act of controlling the gear arrangement after receiving said information indicative of the parking brake being in a released condition.

Example 3: The computer system of Example 2, wherein the processing circuitry is further configured to, upon receiving said information indicative of the parking brake being in a released condition and based on the information from the in-cabin sensor and at least one of the gradient determining device and said sensor device:
- send an instruction message to a parking brake system to apply the parking brake, wherein the processing circuitry is configured to perform said act of controlling the gear arrangement upon determining that application of the parking brake has failed despite the sending of the instruction message.

Example 4: The computer system of any one of Examples 1-3, wherein the processing circuitry is further configured to, upon determination that the vehicle is still in motion despite the controlling of the gear arrangement:
- control a retarder of the vehicle to become engaged for counteracting the vehicle motion.

Example 5: The computer system of any one of Examples 1-4, wherein if the information from the gradient determining device is indicative of the vehicle standing in uphill, the processing circuitry is configured to control the gear arrangement to engage a forward gear, whereas if the information from the gradient determining device is indicative of the vehicle standing in downhill, the processing circuitry is configured to control the gear arrangement to engage a reverse gear.

Example 6: The computer system of any one of Examples 1-5, wherein if the information from the gradient determining device is indicative of the vehicle being on a substantially horizontal surface, the processing circuitry is configured to control a retarder of the vehicle to become engaged.

Example 7: The computer system of any of Examples 1-6, wherein the processing circuitry is further configured to determine, based on input from a brake pedal sensor or lack of input from the brake pedal sensor, that the brake pedal is not being pressed, wherein the processing circuitry is configured to perform said act of controlling the gear arrangement after determining that the brake pedal is not being pressed.

Example 8: The computer system of any one of Examples 1-7, wherein the gradient determining device is one of an inclination sensor, a gyroscope, an inertial measurement unit (IMU), or a GPS unit.

Example 9: A vehicle comprising the computer system of any of Examples 1-8.

Example 10: The vehicle of Example 9, further comprising:
- a gradient determining device configured to send, to the processing circuitry, information indicative of the gradient of the ground on which the vehicle stands,
- a sensor device, such as a wheel speed sensor, configured to send, to the processing circuitry, information indicative of the vehicle being in motion, and
- an in-cabin sensor configured to send, to the processing circuitry, information indicative of the vehicle being inside or outside of the cabin.

Example 11: A computer-implemented method of counteracting motion of a vehicle having a driver's cabin, the method comprising:
- determining, by processing circuitry of a computer system, that an engine or a motor of the vehicle has been turned off,
- receiving, by the processing circuitry, information indicative of the gradient of the ground on which the vehicle stands,
- receiving, by the processing circuitry, information indicative of the vehicle being in motion,
- determining, by the processing circuitry, that the driver is outside of the cabin, and
- controlling a gear arrangement of the vehicle to engage a forward gear or a reverse gear based on the information indicative of the gradient, in order to counteract movement of the vehicle due to the gradient of the ground.

Example 12: The method of Example 11, further comprising:
- receiving, by the processing circuitry, information indicative of the parking brake of the vehicle being in a released condition, wherein said controlling of the gear arrangement is performed after receiving said information indicative of the parking brake being in a released condition.

Example 13: The method of Example 12, further comprising, upon receiving said information indicative of the parking brake being in a released condition, and based on the determination that the driver is outside of the cabin and on at least one of the information indicative of the gradient and the information indicative of the vehicle being in motion:
- sending, by the processing circuitry, an instruction message to a parking brake system to apply the parking brake, wherein said controlling of the gear arrangement is performed upon determining that application of the parking brake has failed despite said sending of the instruction message.

Example 14: The method of any one of Examples 11-13, further comprising, upon determination that the vehicle is still in motion despite the controlling of the gear arrangement:
- controlling, by the processing circuitry, a retarder of the vehicle to become engaged for counteracting the vehicle motion.

Example 15: The method of any of Examples 11-14, further comprising:
- upon determination that the vehicle is standing in uphill, controlling, by the processing circuitry, the gear arrangement to engage a forward gear, and
- upon determination that the vehicle is standing in downhill, controlling, by the processing circuitry, the gear arrangement to engage a reverse gear.

Example 16: The method of any of Examples 11-15, further comprising:
- upon determination that the vehicle is standing on substantially horizontal surface, controlling, by the processing circuitry, a retarder of the vehicle to become engaged.

Example 17: The method of any of Examples 11-16, further comprising:
- determining, by the processing circuitry, that the brake pedal of the vehicle is not being pressed, wherein said controlling of the gear arrangement is performed after determining that the brake pedal is not being pressed.

Example 18: A computer program product comprising program code for performing, when executed by the processing circuitry, the method of any of Examples 11-17.

Example 19: A non-transitory computer-readable storage medium comprising instructions, which when executed by the processing circuitry, cause the processing circuitry to perform the method of any of Examples 11-17.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising processing circuitry configured to:
    determine, for a vehicle comprising a driver's cabin, that an engine or a motor of the vehicle has been turned off,
    receive, from a gradient determining device provided on the vehicle, information indicative of a gradient of a ground on which the vehicle stands,
    receive, from a sensor device of the vehicle, information indicative of the vehicle being in motion, determine, based on information or based on lack of information from an in-cabin sensor of the vehicle, that the driver is outside of the cabin,
    control a gear arrangement of the vehicle to engage a forward gear or a reverse gear based on the information from the gradient determining device, in order to counteract movement of the vehicle due to the gradient of the ground.

2. The computer system of claim 1, wherein the processing circuitry is further configured to:
    receive, from a parking brake sensor, information indicative of a parking brake of the vehicle being in a released condition,
    wherein the processing circuitry is configured to perform said act of controlling the gear arrangement after receiving said information indicative of the parking brake being in the released condition.

3. The computer system of claim 2, wherein the processing circuitry is further configured to, upon receiving said information indicative of the parking brake being in the released condition and based on the information from the in-cabin sensor and at least one of the gradient determining device and said sensor device:
    send an instruction message to a parking brake system to apply the parking brake,
    wherein the processing circuitry is configured to perform said act of controlling the gear arrangement upon determining that application of the parking brake has failed despite the sending of the instruction message.

4. The computer system of claim 1, wherein the processing circuitry is further configured to, upon determination that the vehicle is still in motion despite the controlling of the gear arrangement:
    control a retarder of the vehicle to become engaged for counteracting the vehicle motion.

5. The computer system of claim 1, wherein if the information from the gradient determining device is indicative of the vehicle standing in uphill, the processing circuitry is configured to control the gear arrangement to engage the forward gear, whereas if the information from the gradient determining device is indicative of the vehicle standing in downhill, the processing circuitry is configured to control the gear arrangement to engage the reverse gear.

6. The computer system of claim 1, wherein if the information from the gradient determining device is indicative of the vehicle being on a substantially horizontal surface, the processing circuitry is configured to control a retarder of the vehicle to become engaged.

7. The computer system of claim 1, wherein the processing circuitry is further configured to determine, based on input from a brake pedal sensor or lack of input from the brake pedal sensor, that a brake pedal is not being pressed, wherein the processing circuitry is configured to perform said act of controlling the gear arrangement after determining that the brake pedal is not being pressed.

8. The computer system of claim 1, wherein the gradient determining device is one of an inclination sensor, a gyroscope, an inertial measurement unit, or a GPS unit.

9. A vehicle comprising the computer system of claim 1.

10. The vehicle of claim 9, further comprising:
    the gradient determining device configured to send, to the processing circuitry, information indicative of the gradient of the ground on which the vehicle stands,
    the sensor device configured to send, to the processing circuitry, information indicative of the vehicle being in motion, and
    the in-cabin sensor configured to send, to the processing circuitry, information indicative of the driver being inside or outside of the cabin.

11. A computer-implemented method of counteracting motion of a vehicle having a driver's cabin, the method comprising:
    determining, by processing circuitry of a computer system, that an engine or a motor of the vehicle has been turned off,
    receiving, by the processing circuitry, information indicative of a gradient of a ground on which the vehicle stands,
    receiving, by the processing circuitry, information indicative of the vehicle being in motion, determining, by the processing circuitry, that the driver is outside of the cabin, and
    controlling a gear arrangement of the vehicle to engage a forward gear or a reverse gear based on the information indicative of the gradient, in order to counteract movement of the vehicle due to the gradient of the ground.

12. The method of claim 11, further comprising:
    receiving, by the processing circuitry, information indicative of a parking brake of the vehicle being in a released condition,
    wherein said controlling of the gear arrangement is performed after receiving said information indicative of the parking brake being in the released condition.

13. The method of claim 12, further comprising, upon receiving said information indicative of the parking brake being in the released condition, and based on the determination that the driver is outside of the cabin and on at least one of the information indicative of the gradient and the information indicative of the vehicle being in motion:
    sending, by the processing circuitry, an instruction message to a parking brake system to apply the parking brake,
    wherein said controlling of the gear arrangement is performed upon determining that application of the parking brake has failed despite said sending of the instruction message.

14. The method of claim 11, further comprising, upon determination that the vehicle is still in motion despite the controlling of the gear arrangement:
    controlling, by the processing circuitry, a retarder of the vehicle to become engaged for counteracting the vehicle motion.

15. The method of claim 11, further comprising:
    upon determination that the vehicle is standing in uphill, controlling, by the processing circuitry, the gear arrangement to engage the forward gear, and upon determination that the vehicle is standing in downhill, controlling, by the processing circuitry, the gear arrangement to engage the reverse gear.

16. The method of claim 11, further comprising:
upon determination that the vehicle is standing on substantially horizontal surface, controlling, by the processing circuitry, a retarder of the vehicle to become engaged.

17. The method of claim 11, further comprising:
determining, by the processing circuitry, that a brake pedal of the vehicle is not being pressed, wherein said controlling of the gear arrangement is performed after determining that the brake pedal is not being pressed.

18. A non-transitory computer-readable storage medium comprising instructions, which when executed by the processing circuitry, cause the processing circuitry to perform the method of claim 11.

* * * * *